(No Model.)

F. KING & E. CLARK.
SECONDARY BATTERY.

No. 500,394. Patented June 27, 1893.

Witnesses:—

Inventors:
Frank King and
Edward Clark by
Pollok & Mauro their attorneys

UNITED STATES PATENT OFFICE.

FRANK KING AND EDWARD CLARK, OF LONDON, ENGLAND.

SECONDARY BATTERY.

SPECIFICATION forming part of Letters Patent No. 500,394, dated June 27, 1893.

Application filed March 16, 1893. Serial No. 466,304. (No model.)

*To all whom it may concern:*

Be it known that we, FRANK KING, residing at 4 Great Winchester Street, and EDWARD CLARK, residing at West Ferry Road, Millwall, London, England, electrical engineers, subjects of the Queen of Great Britain and Ireland, have invented certain Improvements in Secondary Batteries, of which the following is a specification.

Our invention relates to an improved form of grid, retainer, or support for the active material of secondary batteries wherein pins are employed projecting from the body of the grid, retainer, or support into the openings for the active material.

According to our invention we prepare grids, retainers or supports, having perforations or interstices of any suitable form but with pins or projections protruding from the inner walls of the perforations or interstices and extending inward or toward the center of the perforations or interstices and curved round or inclined at an angle to the sides or faces of the grid, retainer, or support so as to form a claw-like arrangement to engage and retain in position, the active material which is placed in the perforations or interstices of the grid, retainer, or support, without distortion of the plate by the expansion of the active material. The pins, or projections, are in any suitable number but generally we prefer one from each side of the inner walls of the perforations, or interstices, the said pins, or projections, being alternately reversely inclined, or curved toward the face of the plate.

Figure 1:
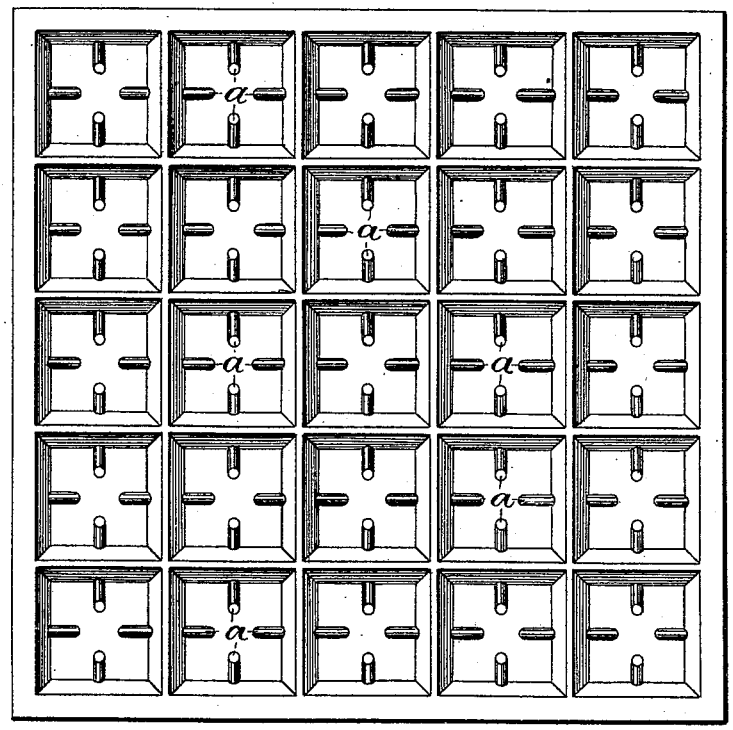
Figure 2:

The accompanying drawings show in side view in Figure 1, and in transverse section in Fig. 2 a part of a grid, retainer, or support, constructed according to our invention.

The pins, or projections, forming the claw-like arrangement, are shown at *a*. We have shown four-sided openings in the grid, retainer, or support, and a pin, or projection, from each side but there may be any other number of sides and pins as desired. By the means described the perforations, or interstices, in the grid, retainer, or support, may be much larger than are those usually employed in secondary battery-plates while all the advantages of small perforations are retained and the active material is securely held by the claw-like arrangement of the pins, or projections, so as to prevent the said material from falling away from its support while allowing it to expand without distorting the plate, as would be the case if the pins, or projections, did not constitute the reversely inclined, or curved, claw-like arrangement shown and described.

Having now particularly described and ascertained the nature of our said invention and in what manner the same is to be performed, we declare that what we claim is—

In or for secondary batteries, a grid, retainer, or support, having perforations, or interstices, from the inner walls of which project pins, or projections, inclined, or curved, reversely, so as to constitute a claw-like arrangement, substantially as and for the purposes hereinbefore described and shown in the accompanying drawings.

In testimony whereof we have signed our names to this specification in the presence of two subscribing witnesses.

FRANK KING.
EDWARD CLARK.

Witnesses:
RUDOLPH CHAS. NICKOL,
S. CRAUSAR,
*Both of 31 Lombard Street, London, E. C.*